Oct. 12, 1965 R. A. ROSENBERG ETAL 3,212,048

MULTILAYER CIRCUITRY WITH SPRING STRIPS

Filed April 30, 1963

2 Sheets-Sheet 1

INVENTORS.
RICHARD A. ROSENBERG
MARTIN A. MITTLER

BY James and Franklin

ATTORNEYS

INVENTORS.
RICHARD A. ROSENBERG
MARTIN A. MITTLER
BY James and Franklin
ATTORNEYS United States Patent Office 3,212,048

Patented Oct. 12, 1965

3,212,048
MULTILAYER CIRCUITRY WITH SPRING STRIPS

Richard A. Rosenberg, Dumont, N.J., and Martin A. Mittler, Flushing, N.Y., assignors to Industrial Electronic Hardware Corp., New York, N.Y., a corporation of New York Filed Apr. 30, 1963, Ser. No. 276,795
9 Claims. (Cl. 339—18)

This invention relates to complex back panel wiring, and more particularly to multiple layer circuitry for accomplishing such wiring, especially but not necessarily for computer racks.

Computers have racks which slidably receive interchangeable printed circuit boards, sometimes called "mother boards" or "cards." These are detachably received in edgeboard connectors at the back, and the contacts of the connectors have lugs for numerous wire connections located behind the rack.

In a copending application Serial No. 168,791 filed January 25, 1962, and now Patent No. 3,179,913, and entitled, "Multilayer circuitry," we disclose the use of multiple printed circuit boards which are co-extensive with the connectors at the back of the rack, and which receive pins pushed through aligned holes in the boards to connect the circuit lines of different boards to each other and/or to an edgeboard connector. The desired wiring is obtained by means of standardized matrix boards. The holes are provided with bushings which contact the pins. To avoid contact where none is wanted, the pin may have one or more insulation bands.

Another arrangement disclosed in our copending application Serial No. 276,830, filed April 30, 1963, employs very short lines or dashes between holes, which dashes must be connected by bushings and washers.

The general object of the present invention is to improve multilayer circuitry. A more specific object is to eliminate the need for bushings at the holes. A further object is to eliminate the need for printing the circuit boards with printed lines. These objects are fulfilled generally by using spring metal strips between holes, the ends of said strips also acting as contacts for engaging the pins and thereby eliminating the need for special bushings for the same purpose.

Another object of the invention is to devise the spring strip circuitry in such form that metal strips disposed end-to-end are in contact and are equivalent to a continuous line on the board.

A still further object is to devise the spring strip circuitry in an alternatively useful form in which metal strips disposed end-to-end have a space therebetween and correspond to short dashes between holes, which remain unconnected unless connected by an inserted pin.

A still further object of the present invention is to so devise the metal strips that they may be readily applied only where needed, and for this purpose the ends of the strips are so formed that the strips may be applied between holes with a simple snap fit insertion.

To accomplish the foregoing general objects and other more specific objects which will hereinafter appear, our invention resides in the multilayer circuitry elements and their relation one to another as are hereinafter more particularly described in the following specification. The specification is accompanied by drawings in which.

Figures 1, 2, 3, 4, 5:
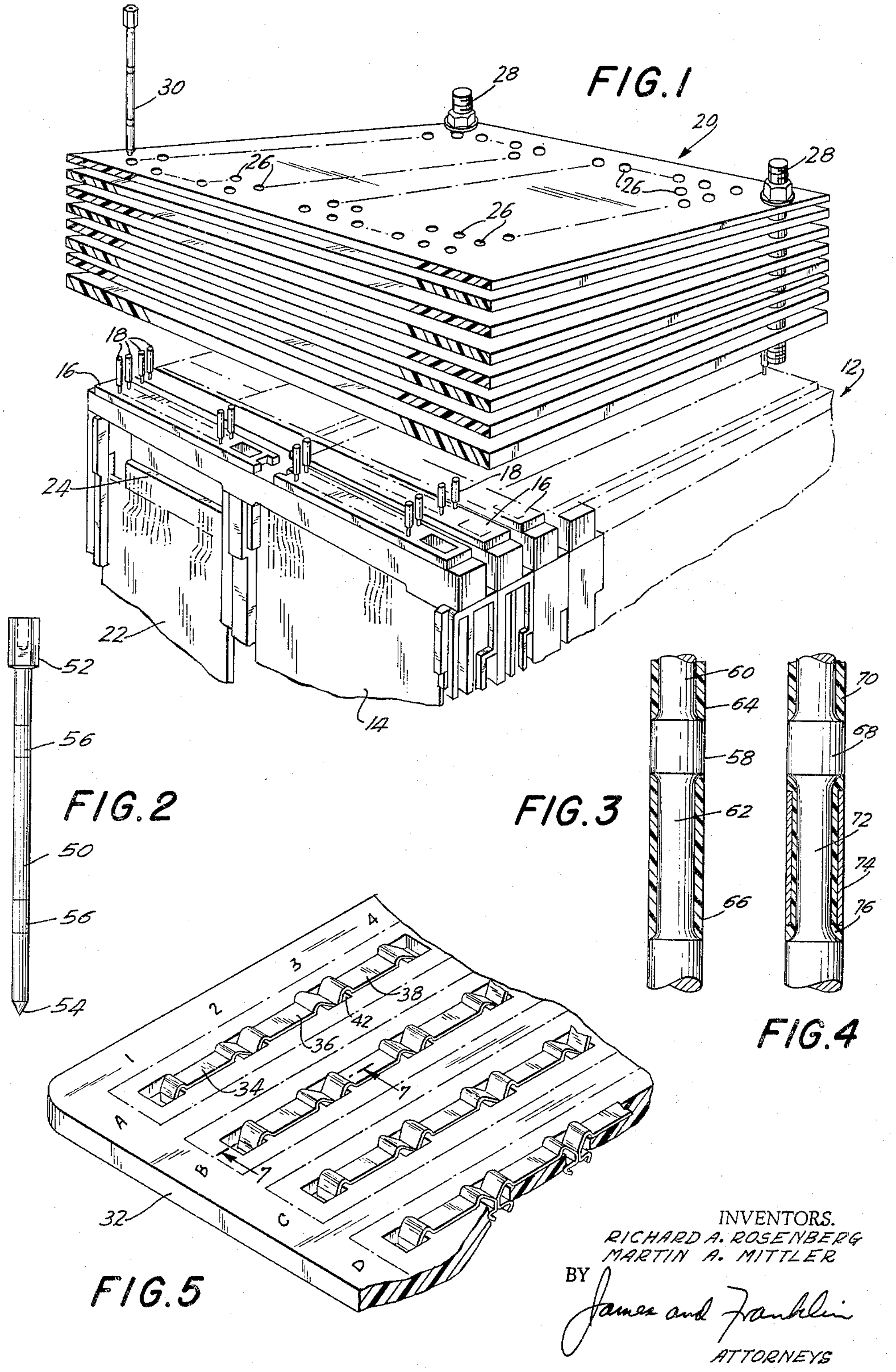
FIG. 1 is a perspective fragmentary view showing matrix boards separated from the back of the rack, with one of the pins about to be inserted in one of the boards.
FIG. 2 is an elevation of a pin with several insulation bands.
FIG. 3 is an enlarged fragmentary section through a pin having insulation bands.
FIG. 4 is a similar section through a pin having an insulated metallic band.
FIG. 5 is a perspective view of a fragment of a board having contacting spring metal strips.

Referring to the drawing, and more particularly to FIG. 1, the computer rack generally designated 12 has guide grooves for the slidable reception of printed circuit boards 14 called "mother boards." The upper edges of the boards are received in edgeboard connectors located at 16. The connectors have a terminal for each contact, resulting in an array of a large number of terminals, a few of which are indicated at 18. There are usually hundreds of such terminals, requiring difficult wiring job to interconnect the same. In accordance with our prior and present inventions, this back panel wiring is replaced by a multilayer matrix indicated generally at 20, the matrix boards being coextensive in area with the array of edgeboard connectors 16, and being disposed perpendicular to the boards 14.

In FIG. 1 the matrix boards are shown disposed over but separated from the back of the rack, the latter having been turned face down so that the boards 14 are upright with their then upper edges received in the edgeboard connectors 16. One board 22 has been slid down somewhat to show its edge 24. The terminals 18 are female, and only a few are shown but it will be understood that the connectors are filled with terminals.

The matrix boards 20 have a large number of holes, only a few of which are indicated at 26. All of the holes in each board are in alignment with the corresponding holes in all of the other boards, and the holes also register with the terminals 18. The boards are held in registration by means of spacers and bolts, two of which are indicated at 28. There are also grounding bolts, not shown, which pass through the matrix boards and into the rear frame of the rack, and these act as ground connections for matrix shielding mentioned later. The said bolts are described in full detail in the aforesaid copending application Serial No. 168,791.

The circuitry is completed by pins, one of which is indicated at 30, and which are dimensioned to pass through the aligned holes, and which in many but not necessarily all cases are received in the terminals 18. Where the spacing of the connectors 16 permits, extra rows of holes may be provided in the boards between connectors to make possible additional connections between matrix boards.

Referring now to FIG. 5 of the drawing, the board 32 is made of an insulation material such as is used for printed circuit boards. It has a full array of holes, which preferably are identified by marking around the periphery of the board. In the present case the columns of holes are numbered 1, 2, 3, etc., and the horizontal rows of holes are marked A, B, C, etc. This alpha-numeric designation may be used to locate any specific one of the holes.

The board is additionally provided with short metal strips 34, 36, 38, etc., each dimensioned to extend from one hole to an adjacent hole, with one end anchored around the edge of one hole, and its other end around the edge of the adjacent hole. The ends and holes are so dimensioned that a pin may be passed through a hole in engagement with one or more (usually two) strip ends anchored in the hole.

Figure 6:
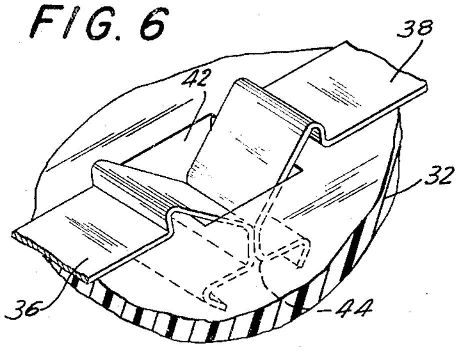
FIG. 6 is a fragmentary perspective view drawn to enlarged scale at one hole.
Figure 7:
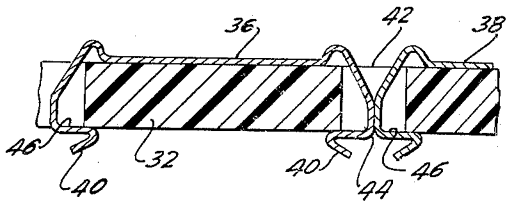
FIG. 7 is a section taken approximately in the plane of the line 7—7 of FIG. 5.

Referring now to FIGS. 6 and 7, the strips 36 and 38 are so shaped at their ends that they may be applied to the board 32 with a snap fit. For this purpose the parts 40 are reversely bent and left in a sloping position so that they have a camming action when pushed through the holes 42, which in the present case are square holes.

In the form of the invention shown in FIGS. 5, 6 and 7 the strips 36 and 38 received in a common hole 42 are in direct electrical contact with one another, as shown at 44. The metal of the strip is spring metal, and is so dimensioned as to provide a contact pressure at 44, in which case the strips form a continuous line. FIG. 5 shows the strips forming horizontal lines, but as explained in our copending applications, another board may have the strips disposed vertically to form vertical lines.

Still another board may have the holes oriented at a 45 degree angle and may be provided with sloping strips to form diagonal lines. Such strips are slightly longer than those shown. Still another board with similarly oriented holes may provide diagonal lines of opposite slope. It will be understood that the abutting ends of the strips are separated by a pin when a pin is driven through a hole, and that the strips yield for that purpose. FIG. 7 shows the clearance provided at 46, and this permits the ends of the strip to yield when a pin is received.

If the pin is conductive the connection between adjacent strips is maintained, and a further connection is provided to the pin. If the pin is insulating, the connection between the strips is broken. A single pin may be conductive at some points and insulating at others. In FIG. 2 the pin 50 is made of metal and its shank is preferably formed integrally with the head 52. The lower end is bluntly pointed at 54 to facilitate driving the pins through the stack of boards. The pin may be supplied in two lengths, the longer length being such that the lower end reaches and is received in the terminals 18. The shorter length is preferably such as to pass through the stack of boards without reaching the terminals 18. Such a pin may be used for connection between boards, with no connection to a terminal 18.

In FIG. 2 the bands 56 represent insulation. A board receiving such a band of insulation has its metal line interrupted by the insulation, and of course the line is not connected to the pin. One or more insulation bands 56 may be located along a pin at points corresponding to one or more selected boards, all properly related to the thickness and spacing of the boards.

Referring to FIG. 3, the pin 58 has been reduced in diameter at the parts 60 and 62, and the resulting space has been filled with insulation material indicated at 64 and 66. This material may be applied and the pins may be made as described in our aforesaid copending application Serial No. 168,791.

A somewhat more complex pin may be made as shown in FIG. 4, in which the shank 68 has an insulation band 70 as previously described. However, the part 72 has a metal band 74 which is insulated from the pin by means of insulation material 76. Such an insulated metal band may be employed when it is desired to maintain the continuity of the metal strips on the board without connecting the strips to the pin.

It will be understood that a large variety of pins may be made, having different combinations of metal, insulation, and insulated metal. Additional variety is obtainable, if desired, by providing short pins which pass only part way instead of all the way through the stack of boards. However it is preferred to use only two lengths, one reaching and the other not reaching the terminals 18.

Pins of even more complex construction may be employed when it is desired to connect several boards to each other, and several other boards to each other but not to the first boards. Such pins are not shown or described herein, but for a detailed description reference may be made to a copending application of Robert B. Pittman, Serial No. 187,692, filed April 16, 1962, and entitled, "Multiple Circuit Pin for Multilayer Circuitry."

In the simplest form the pins may be round in cross section. However, square pins could be used in square holes, but an octagonal section would be preferred over a square section, in order to accommodate diagonal as well as horizontal and vertical lines, as previously mentioned, and also to avoid square corners.

Figures 8, 9, 11:
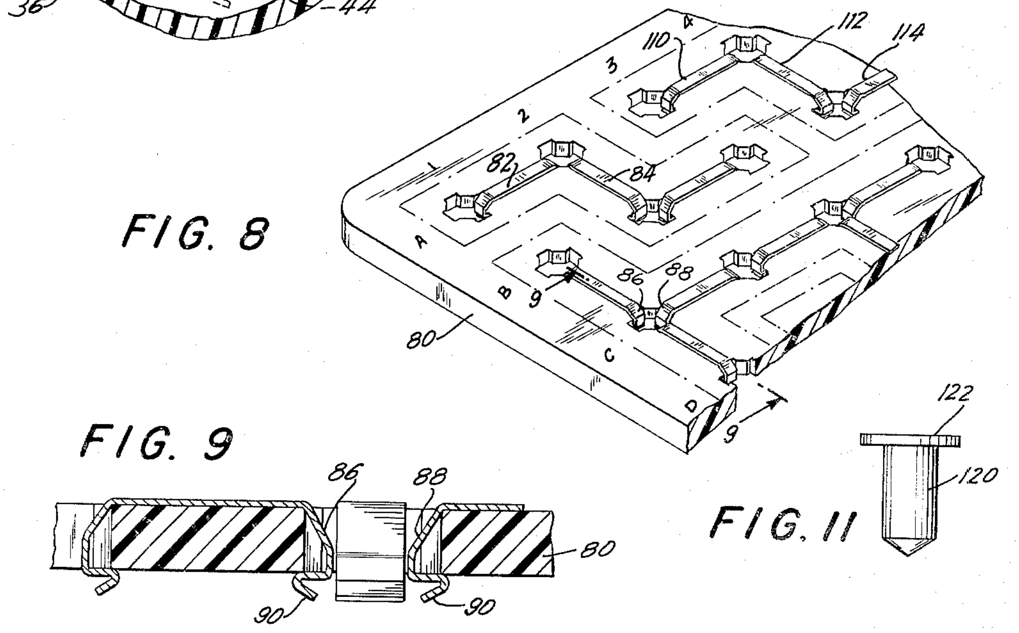
FIG. 8 is a fragmentary perspective view of one corner of a circuit board having metal strips which do not contact at the holes.
FIG. 9 is a fragmentary section through a part of the board shown in FIG. 8.
FIG. 11 shows a very short pin or plug which may be used to connect or to separate adjacent strips where there is no pin.
Figure 10:
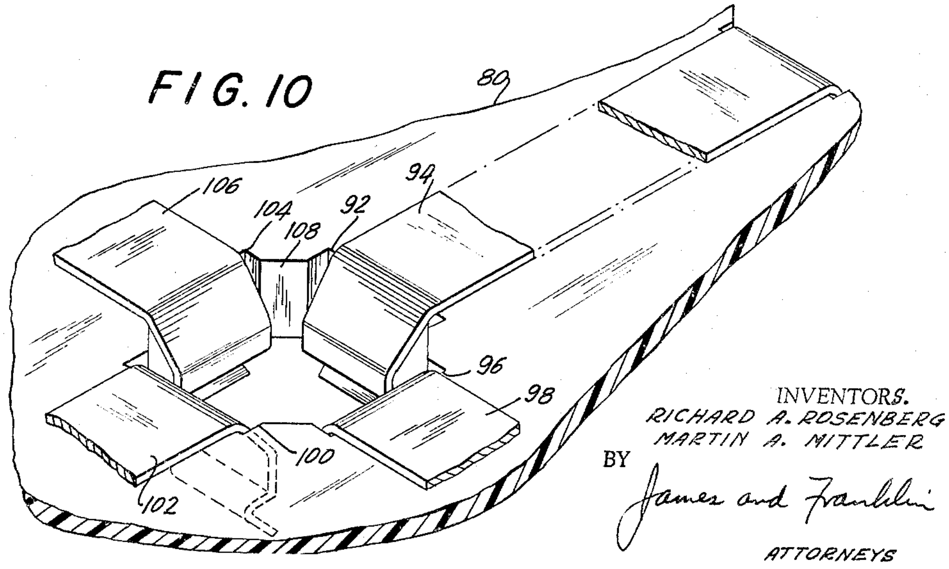
FIG. 10 is a perspective view drawn to enlarged scale at one of the holes.

As so far described, the spring metal strips have been assumed to be in end-to-end contact, unless forced apart by a pin. FIGS. 8, 9 and 10 of the drawing show a different form of the invention in which the spring strips are normally separated, unless intentionally joined by a pin.

In FIG. 8 the holes again may be identified and located by an alpha-numeric designation. The numerals again are used horizontally, and the letters are used vertically. The board 80 has a full array of such holes, and adjacent holes may be connected by metal strips 82. In the present case some strips are horizontal as shown at 82, and some are vertical as shown at 84.

Referring to FIG. 9, the strip ends 86 and 88 in a single hole are spaced apart and provide an open circuit. However, the spacing is less than the pin diameter, and when a metal pin is driven through the hole it is in firm contact with the strip ends,, thus providing a connection from one strip to the next strip and to the pin.

In FIG. 9 it will be seen that there is ample clearance for some spreading apart of the ends 86 and 88 to receive the pin. The lower ends of the strip are bent reversely and sloped as shown at 90, the configuration being such that a strip may be pushed into position in the holes with a snap fit.

While not essential, the holes may be made somewhat cruciform in configuration, and thereby are adapted to receive strips which extend in the same direction or in a direction at right angles. Thus, referring to FIG. 10, a maximum of four strips may radiate from a single hole, the hole being recessed slightly at 92 for the strip 94, at 96 for the strip 98, at 100 for the strip 102 and at 104 for the strip 106. Between the recesses the hole may be cut at an angle as indicated at 108.

It will be understood that in simpler form a circular hole may be used, the diameter of the hole being larger than that of the pin by an amount sufficient to receive the bent ends of the spring metal strips. Such round holes may be preferred for ease in manufacture.

As previously explained, one board may have horizontal lines and another vertical lines. Other boards may have the holes oriented at 45 degress to provide diagonal lines, and the same perforations may be used to provide another board with diagonal lines of opposite slope. When using circular holes the same holes may be used for the diagonal lines. The metal strips for diagonal lines must be made slightly longer for the same array of holes.

Additional boards, or substitute boards, may be made by using horizontal and vertical strips in alternation as suggested in FIG. 8 by the strips 110, 112 and 114. If the strips are continued in alternation, a result is obtained somewhat equivalent to the use of diagonal lines.

However, it should be understood that one important advantage of the present spring metal strips is that the boards, whether of the continuous line type shown in FIG. 5, or the interrupted dashes shown in FIG. 8, may be made to fit particular requirements instead of forming a true complete matrix or grid. The metal strips may be selectively snapped into position between holes designated by the alpha-numeric code in accordance with a plan previously worked out. After the boards have been custom made in this fashion and have been stacked, they receive appropriate pins, each type of pin being differently numbered, and the pins being inserted in appropriate holes again designated by the alpha-numeric code.

With the form of the invention shown in FIG. 5, a continuous line is obtained in the absence of a pin. When using a pin, a continuous line is maintained and there is also a connection to the pin. However, by using an insulation band on the pin as shown in FIG. 3, the line is interrupted and there is no connection to the pin. By using an insulated metal sleeve as shown at 74 in FIG. 4, the continuity of the line is maintained without a connection to the pin. This presupposes that the same pin is needed in connection with the other boards, because otherwise the same result would be obtained by simply omitting the pin altogether.

If non-contacting strips are used as in FIG. 8, the insertion of a metal pin connects the strips to one another and to the pin. By using an insulation band on the pin as shown in FIG. 3, the open circuit between strips is maintained and there is no connection to the pin. This, of course, presupposes that the same pin is needed for connection with other boards, because otherwise it would be easier to simply omit the pin. By using an insulated metal sleeve on the pin as in FIG. 4 the strips are connected to one another but not to the pin. It may also be mentioned that another way to provide a line which has continuity but which is not connected to a pin is to insert strips which carry the circuit around the pin. In such case a simple metal pin may be employed instead of the more complex pin shown in FIG. 4, but there is the disadvantage of occupying other holes which might be wanted for another purpose.

Short stubby plugs may be employed in a single board, with no connection to other boards. Such a plug is shown at 120 in FIG. 11. Its insertion is limited by a flange 122. The plug is made in two types, one made of metal, and the other made of insulation. The plug is a very short pin, but is termed a plug to distinguish it from the regular long pins. An insulation plug when used in the board of FIG. 5 interrupts an otherwise continuous line. A metal plug when used with the open-circuited strips of FIG. 8 serves to connect the strips which otherwise would not be in contact.

Such plugs are also employed in those edge holes in the board of FIG. 5 which are not anyway occupied by regular pins. This is done to prevent longitudinal movement of an end strip. Special end strips of greater length could be made, instead of using plugs.

If grounded shield lines or areas are needed between the circuit lines, these could be applied by printing such areas, or by the provision of extra holes carrying extra spring metal strips. Such shield areas are suggested in broken lines in FIGS. 5 and 8.

It will be understood that matrix boards may be made which are filled with strips, as in the prior patent applications referred to above. Thus, one board may have horizontal strips, another vertical strips, another diagonal strips, and another diagonal strips sloping in opposite direction. There may be a plurality of sets of such boards. Extra boards may be provided which are not in sets, that is, there may be more of some kinds than others, as may be found desirable when planning the needed wiring. The wiring then depends on the types and location of the pins.

The multilayer circuitry has been shown applied to a computer rack, but it is useful for other purposes, and particularly where there is a large area of numerous closely spaced terminals to be interconnected.

It is believed that the construction and method of use of four improved multilayer circuitry with spring metal strips, as well as the advantages thereof, will be apparent from the foregoing detailed description. It will also be apparent that while we have shown and described the improvement in several preferred forms, changes may be made in the structures shown without departing from the scope of the invention, as sought to be defined in the following claims.

We claim:

1. A circuit board made of insulation material and having a full array of closely spaced holes over substantially its entire surface, said holes being so located as to form lines of holes, short flat resilient metal strips each dimensioned to extend from one hole to an adjacent hole with one end anchored around the edge of one hole and its other end anchored around the edge of the adjacent hole with a snap arrangement, said ends and holes being so dimensioned that a pin may be passed through a hole in engagement with one or more strip ends anchored in said hole, and a plurality of contact pins having shanks of uniform diameter inserted in said holes in a direction perpendicular to said board, each end of the flat metal strip being bent downward through the hole and then away from the hole beneath the board and then reversely toward the center of the hole, the resulting reversely bent tips sloping downward in such direction as to ease the snapping of a strip into its holes, the upper end of the downwardly bent part sloping toward the center of the hole in order to ease the passage of a pin through the hole in sliding contact with the ends of the strips in the hole.

2. Circuitry as defined in claim 1 in which the holes are somewhat cruciform in configuration to provide notches in which the strip ends are received.

3. Circuitry as defined in claim 1 in which the ends of aligned strips received in a common hole are in direct electrical contact with one another in the absence of a pin, and are separated by a pin when the pin is driven through the hole.

4. Circuitry as defined in claim 1 in which the holes are square, and in which the ends of aligned strips received in a common hole are in direct electrical contact with one another in the absence of a pin, and are separated by a pin when the pin is driven through the hole, the circuit between said strips being maintained when the pin is conductive, and being broken when the pin is insulating.

5. A circuit board made of insulation material and having a full array of closely spaced holes over substantially its entire surface, said holes being so located as to form lines of holes, short metal strips each dimensioned to extend from one hole to an adjacent hole with one end anchored around the edge of one hole and its other end anchored around the edge of the adjacent hole, said ends and holes being so dimensioned that a pin may be passed through a hole in engagement with one or more strip ends anchored in said hole, and a plurality of contact pins inserted in said holes in a direction perpendicular to said board, some of said pins being conductive and some being insulating pins, the ends of the aligned strips received in a common hole being in direct electrical contact with one another in the absence of a pin to form a matrix of conductive lines, and said ends being separated by a pin when the pin is driven through the hole, the circuit between said strips being maintained when the pin is conductive, and being broken when the pin is insulating.

6. Multilayer circuitry comprising a plurality of superposed boards, said boards each having a full array of closely spaced aligned holes over substantially its entire surface, said holes being so located as to form lines of holes to receive transverse contact pins, and short metal strips each made of a flat strip of resilient metal dimensioned to extend from one hole to an adjacent hole with one end anchored around the edge of one hole and its other end anchored around the edge of the adjacent hole, and a plurality of contact pins having uniform diameter shanks dimensioned to be passed through aligned holes, said pins being inserted through said aligned holes in a direction perpendicular to said boards, said strip ends and holes being so dimensioned that the pins may be driven through the holes in contact with one or more strip ends anchored in the holes, each end of the flat metal strip being bent downward through the hole and then away from the hole beneath the board and then reversely toward the center of the hole, the resulting reversely bent tips sloping downward in such direction as to ease the snapping of a strip into its holes, the upper end of the downwardly bent part sloping toward the center of the hole in order to ease the passage of a pin of uniform diameter through the hole in sliding contact with the ends of the strips in the holes, said pins being long enough to provide connections between the strips of the superposed boards.

7. Circuitry as defined in claim 6 in which the ends of aligned strips received in a common hole are in direct electrical contact with one another in the absence of a pin, and are separated by a pin when the pin is driven through the hole, and in which there are both metal and insulating pins, the circuit between said strips being maintained when the pin is conductive, and being broken when the pin is insulating.

8. Multilayer circuitry comprising a plurality of superposed boards, said boards each having a full array of closely spaced aligned holes over substantially its entire surface, said holes being so located as to form lines of holes to receive transverse contact pins, and short spring metal strips each made of a flat strip of resilient metal dimensioned to extend from one hole to an adjacent hole with one end anchored around the edge of one hole and its other end anchored around the edge of the adjacent hole with a snap engagement, and a plurality of contact pins having uniform diameter shanks dimensioned to be passed through aligned holes, some pins being conductive and some being insulating, said pins being inserted through said aligned holes in a direction perpendicular to said boards, said strip ends and holes being so dimensioned that the pins may be driven through the holes between and in contact with the strip ends in the holes, said pins being long enough to provide connections between the strips of the superposed boards, the ends of aligned strips which are received in a common hole being in direct electrical contact with one another in the absence of a pin, and being separated by a pin when the pin is driven through the hole, the circuit between said strips being maintained when the pin is conductive, and being broken when the pin is insulating.

9. Multilayer circuitry comprising a plurality of superposed boards, said boards each having a full array of closely spaced aligned holes over substantially its entire surface, said holes being square and being so located as to form lines of holes to receive transverse contact pins, and short spring metal strips each made of a flat strip of resilient metal dimensioned to extend from one hole to an adjacent hole with one end anchored around the edge of one hole and its other end anchored around the edge of the adjacent hole with a snap engagement, and a plurality of contact pins having uniform diameter shanks dimensioned to be passed through aligned holes, said pins being inserted through said aligned holes in a direction perpendicular to said boards, said strip ends and holes being so dimensioned that the pins may be driven through the holes between and in contact with the strip ends in the holes, said pins being long enough to provide connections between the strips of the superposed boards, the ends of aligned strips which are received in a common hole being in direct electrical contact with one another in the absence of a pin, and being separated by a pin when the pin is driven through the hole, the circuit between said strips being maintained when the pin is conductive, and being broken when the pin is insulating.

References Cited by the Examiner

UNITED STATES PATENTS

| | | | |
|---|---|---|---|
| 332,336 | 12/85 | Fee | 339—176 X |
| 840,537 | 1/07 | Weir | 339—18 X |
| 1,169,099 | 1/16 | Wilcox et al. | 339—176 X |
| 1,780,413 | 11/30 | Williams | 339—176 X |
| 2,551,970 | 5/51 | Sampson | 339—217 X |
| 2,724,811 | 11/55 | Poupitch | 339—132 |
| 2,889,532 | 6/59 | Slack | 339—18 |
| 2,967,285 | 1/61 | Freitas | 339—18 |
| 3,065,440 | 11/62 | Bonwitt et al. | 339—18 |
| 3,162,500 | 12/64 | Pittman | 339—18 |

FOREIGN PATENTS

| | | |
|---|---|---|
| 70,102 | 10/58 | France. |

JOSEPH D. SEERS, *Primary Examiner.*

PATRICK A. CLIFFORD, *Examiner.*